United States Patent [19]

Feriozi et al.

[11] Patent Number: 5,307,491

[45] Date of Patent: Apr. 26, 1994

[54] LAYERED SCSI DEVICE DRIVER WITH ERROR HANDLING CIRCUIT PROVIDING SENSE DATA FROM DEVICE DIRECTLY TO THE DRIVER ON THE OCCURRENCE OF AN ERROR

[75] Inventors: Dan Trotter Feriozi, Pompano Beach; Bharat Khatri, Boca Raton, both of Fla.

[73] Assignee: International Business Machines Corporation, Armonk, N.Y.

[21] Appl. No.: 654,441

[22] Filed: Feb. 12, 1991

[51] Int. Cl.$^5$ .................... G06F 13/00; G06F 11/00
[52] U.S. Cl. .................... 395/700; 395/275; 395/325; 395/500; 395/575; 364/239; 364/265.5; 364/926.93; 364/927.99; 364/929.2; 364/943.9; 364/944.7; 364/DIG. 2
[58] Field of Search ............ 395/700, 275, 325, 500, 395/800, 650, 575, 425

[56] References Cited

U.S. PATENT DOCUMENTS

| | | | |
|---|---|---|---|
| 4,649,479 | 3/1987 | Advani et al. | 395/700 |
| 5,083,262 | 1/1992 | Haff, Jr. | 395/500 |
| 5,136,709 | 8/1992 | Shirakabe et al. | 395/700 |
| 5,179,666 | 1/1993 | Rimmer et al. | 395/275 |

Primary Examiner—Thomas C. Lee
Assistant Examiner—Peter Y. Wang
Attorney, Agent, or Firm—George E. Grosser; Douglas R. McKechnie

[57] ABSTRACT

A tiered device driver system includes a SCSI generic device driver (SGDD) in one tier and one or more SCSI device-class drivers (SDCD) in another tier. In response to a request to access a SCSI device, the operating system creates a request packet that is passed to the appropriate SDCD. Such SDCD creates a generic request packet and associated data structures that contain information specific to the SCSI device being accessed. The generic request packet is passed on to a SCSI generic device driver (SGDD) that creates a SCSI ABIOS request block which it transmits to a SCSI adapter for accessing the desired SCSI device. The SGDD provides functions common to the SDCDs.

4 Claims, 7 Drawing Sheets

LAYERED SCSI DEVICE DRIVER WITH ERROR HANDLING CIRCUIT PROVIDING SENSE DATA FROM DEVICE DIRECTLY TO THE DRIVER ON THE OCCURRENCE OF AN ERROR

FIELD OF THE INVENTION

This invention relates to the field of data processing, and, more particularly to improvements in device drivers for controlling or managing the flow of data to and from SCSI devices in a programmed data processing system having a multitasking operating system such as OS/2 operating system.

BACKGROUND OF THE INVENTION

By way of background, device drivers are programs or routines which control or manage the flow of data to and from I/O devices. The drivers form part of and interact with other portions of an operating system. An operating system normally includes a basic set of device drivers for I/O devices, such as a keyboard, fixed and floppy disks, display, and printer, commonly used in a personal computer. When an I/O device is added to a data processing system, and such device is not operable under an existing driver, a new driver must be added to the system in order to use the device. Such new driver is customarily supplied by the maker of the I/O device and is installed in the system in accordance with procedures established by the operating system. In personal computers operating with IBM DOS or OS/2 operating systems, such drivers are installed, when the computers are started or rebooted, using commands or instructions in a CONFIG.SYS file.

The high performance models of the IBM PS/2 personal computers include a bus designed in accordance with Micro Channel architecture. (IBM, OS/2, PS/2 and Micro Channel are trademarks of International Business Machines Corporation). Such bus is referred to hereinafter as an "IMC bus" and provides the means by which additional I/O devices and subsystems can be connected to the personal computers. A SCSI (Small Computer System Interface) bus is a bus designed in accordance with SCSI architecture, and provides a standardized design for the attachment thereto of I/O devices known as SCSI devices, that is, devices specifically designed for attachment to a SCSI bus. Such architecture defines a SCSI command set for accessing the devices. Recently, a SCSI adapter and SCSI ABIOS (advanced basic input/output operating system) were developed which allow SCSI devices to be connected to PS/2 computers through the MC bus, and this has created some difficulties or problems which the present invention overcomes.

First, the basic OS/2 drivers for common (non-SCSI) I/O devices cannot be used with SCSI devices, and a driver written for use with one type of operating system cannot be used with another type. Accordingly, the makers of SCSI devices are faced with the prospect of having to write multiple drivers, one for each type of operating system for which they expect to market a SCSI device. A complete driver is relatively complex and commonly requires many programmer months to develop. This can add up to a substantial development effort if several devices must be supported under different operating systems, and it may delay the general availability and widespread use of SCSI devices. The invention, as described in greater detail below, has an objective of simplifying the driver to be provided by a maker or supplier of SCSI devices for use in a data processing system programmed to operate under OS/2 operating system. Simplification makes it easier and cheaper to develop and supply such drivers. This objective is accomplished by a two tier driver system in which the SCSI developer provides a SCSI driver that is specific to a class of SCSI devices, and the operating system includes a generic SCSI driver having functions commonly used by the specific driver classes. Not only does such system eliminate the need for developers to include common functions but it also hides from the developer the need to program to the relatively complex interface with ABIOS.

Second, PS/2 personal computers include microprocessors that operate in both real mode and protected mode. Bimodal operation provides compatibility with older application programs and allows such microprocessors to run both application programs written for a DOS environment and application programs written for an OS/2 environment. Device drivers are also bimodal so that such drivers and corresponding devices can be used for both DOS and OS/2 application programs. Under OS/2, device drivers are loaded into the low end of physical memory for access by both DOS and OS/2 application programs. The more drivers there are, the more memory space is used thereby limiting the amount of physical memory space used for DOS application programs which run in real mode. Thus, another objective of the invention is to provide a SCSI driver system which efficiently uses memory address space. This objective is also satisfied by having a two tier driver system in which common functions are included in a generic driver. The common functions are used by SCSI device-class drivers and thus avoid the need for each driver to be complete in itself and thereby duplicate functions and waste memory space.

SUMMARY OF THE INVENTION

One of the objects of the invention is to provide a driver system useful in personal computers which support SCSI peripheral devices under the OS/2 operating system.

Another object of the invention is provide a tiered driver system for SCSI devices operating under the OS/2 operating system, in which one tier contains drivers providing functions specific to classes of SCSI devices, and another tier contains a device driver providing functions that are common or generic to the device specific drivers.

A further object of the invention is to provide a tiered SCSI device driver system operable under OS/2 in bimodal manner to support application programs running in a real mode and in a protected mode.

Still another object of the invention is to provide a tiered SCSI device driver system that uses previously existing interfaces to other portions of OS/2 operating system, to thereby simplify the use and development of such drivers.

Another object of the invention is to provide a tiered SCSI device driver system that efficiently utilizes memory space.

Yet another object of the invention is to provide an interrupt driven device driver system in which performance is improved by requiring only one interrupt handler for all of the SCSI devices controlled by device-class drivers.

A further object of the invention is to provide a generic SCSI device driver that reduces the functions to be included in a driver supplied by a SCSI device developer to those functions that are specific to the particular class of SCSI device.

Still another object of the invention is to provide a device driver system with improved error handling whereby sense data for indicating the nature of an error encountered while attempting to access a device, is rapidly returned to a processing routine to prevent loss of the data.

Briefly, in accordance with the invention, a tiered device driver system includes a SCSI generic device driver (SGDD) in one tier and one or more SCSI device-class drivers (SDCD) in another tier. In response to a request to access a SCSI device, the operating system creates a request packet that is passed to the appropriate SDCD. Such SDCD creates a generic request packet and associated data structures that contain information specific to the SCSI device being accessed. The generic request packet is passed on to a SCSI generic device driver (SGDD) that creates a SCSI ABIOS request block which it transmits to a SCSI adapter for accessing the desired SCSI device. The SGDD provides functions common to the SDCDs.

DRAWINGS

Other objects and advantages of the invention will be apparent from the following description taken in connection with the accompanying drawings wherein.

DETAILED DESCRIPTION

Figure 1:
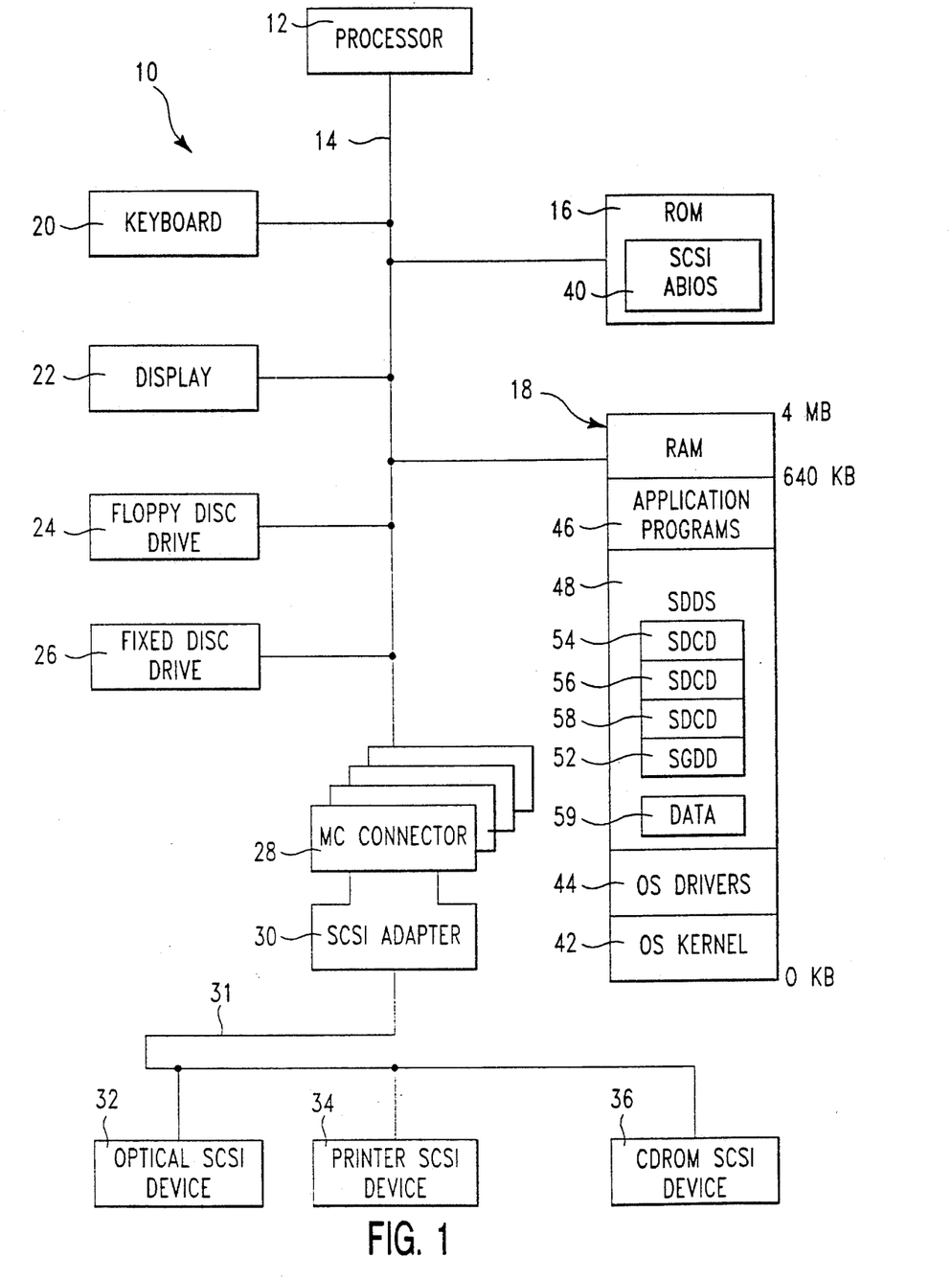
FIG. 1 is a block diagram of a data processing system embodying the invention.

Referring now to the drawings, and first to FIG. 1, there is shown a data processing system 10 operable under an operating system such as OS/2. System 10 comprises a processor 12 connected to a bus system 14 which interconnects other elements of system 10. The other elements include a ROM (read only memory) 16, a RAM (random access memory) 18, a keyboard 20, a display 22, a floppy disc drive 24, a fixed disc drive 26, and a plurality of MC (Micro Channel) connectors 28. A SCSI host adapter 30 is plugged into one of connectors 28 and is connected to a SCSI bus 31 and three different types of exemplary SCSI devices 32, 34, and 36. The types of illustrated SCSI devices are an optical SCSI device 32, a printer SCSI device 34, and a CDROM SCSI device 36. ROM 16 stores SCSI ABIOS (advanced basic I/O system) 40.

The SCSI devices, in accordance with the SCSI architecture thereof, respond to device commands embedded in control blocks that are sent to a device from SCSI adapter 30. SDDS 48 functions to deliver information for the control block to SCSI BIOS 40 which delivers the required control block to the device being accessed. Adapter 30 requires more information than just a SCSI control block. It needs to know the memory storage address of data and the requested direction of data flow, in order to control the flow of data to and from the SCSI device.

RAM 18 may be of a size up to sixteen MB (megabytes) and is typically four MB as shown in FIG. 1. After system 10 is started and initialized, the kernel 42 of the OS/2 operating system is stored in RAM 18 at the low end of the address space along with the basic OS drivers 44 for controlling the standard devices such as the keyboard, display, floppy disc drive, and fixed disc drive. When running in real mode, application programs 46 are stored in the address space below 640 KB (kilobytes) in whatever space is available after the other programs have been loaded in such space. The amount of memory allocated to such application programs is thus dependent on the sizes of such other programs including the device drivers. In order to operate the SCSI devices 32, 34, and 36, a SDDS (SCSI device driver system) 48 is also stored in the low end of RAM 18 for access by programs running in real and protected modes. SDDS 48 includes a two tiered driver system. One tier includes a SGDD (SCSI generic device driver) 52. The other tier includes a plurality of SDCD (SCSI device-class drivers) 54, 56, and 58 correspondingly specific to different classes of SCSI devices 32, 34, and 36. A given SDCD can access more than one device provided the device is of the class for which the driver is designed to operate. SDDS also includes a data area 59 used by the programs. Except for SDDS 48, the remaining hardware and software of data processing system 10 are known, commercially available items.

Figure 2:
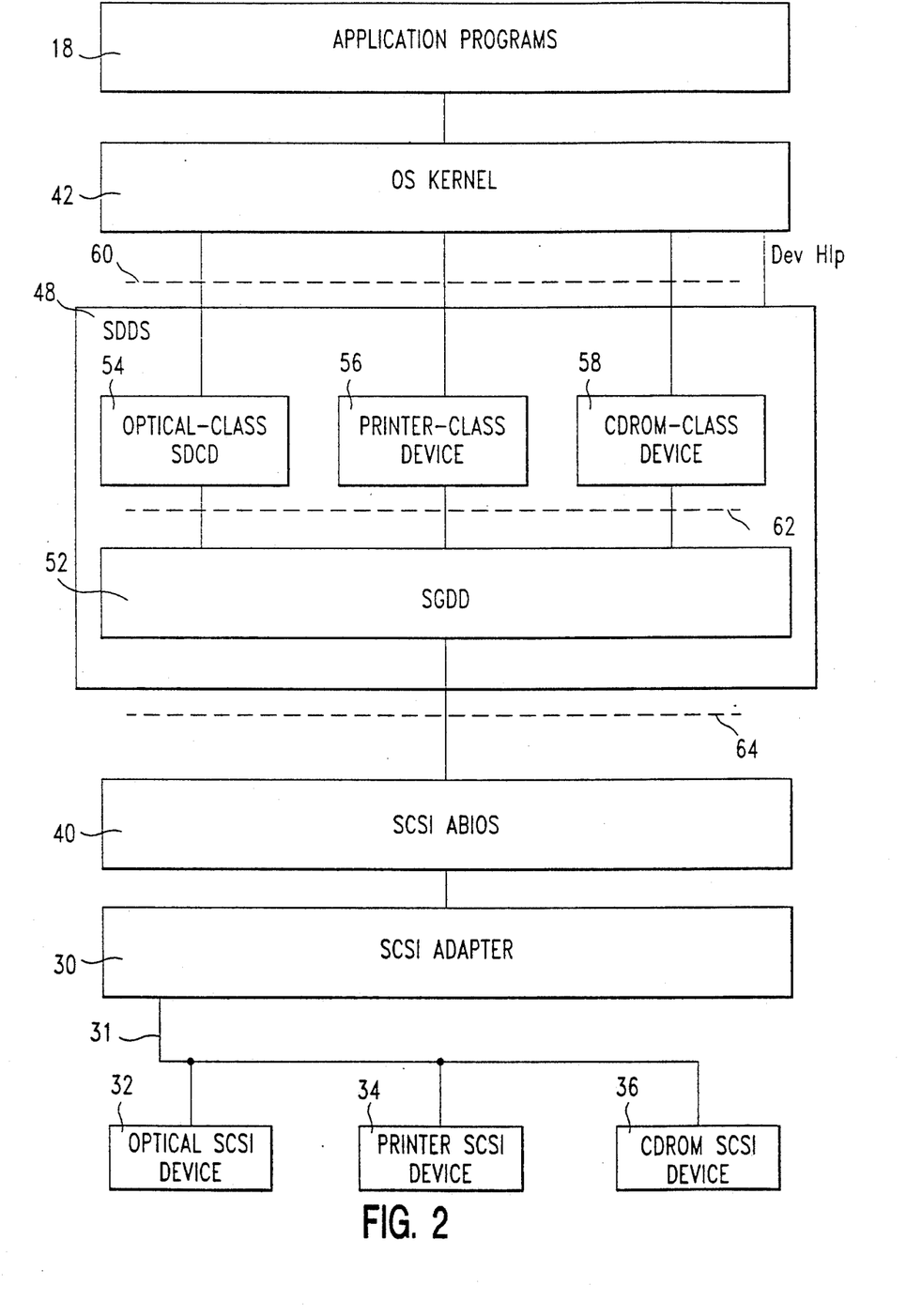
FIG. 2 is a block diagram of a more detailed portion of the invention.

FIG. 2 shows certain of the elements shown in FIG. 1, in a layered structure or model indicating the logical relationship of the elements, and their interfaces. Application programs 18 run in a real mode or a protected mode and coact with OS kernel 42 in order to use I/O devices including SCSI devices 32, 34, and 36. SDDS fits between kernel 42 and SCSI ABIOS 40. Kernel 42 coacts with the tier of SDCDs 54, 56, and 58 through an interface 60 and also provides standard device driver helper routines known as DevHlp services. The SDCDs coact with SGDD 52 through an interface 62, and the SGDD coacts with SCSI ABIOS 40, through an interface 64. SCSI ABIOS 40 interacts with SCSI adapter 30 which in turn controls the various SCSI devices 32, 34, and 36. The interfaces between the elements, other than interfaces 60, 62, and 64, are known interfaces and need not be described in detail. The system is considered layered with application programs being the uppermost layer and hardware devices being the lowest layer. As control progresses through the layers from the top down, each layer becomes progressively more detailed and the SCSI ABIOS layer is the software layer that handles the specific details of operating the specific SCSI devices. SCSI ABIOS is designed to operate in a multitasking, interrupt driven environment and is operating system independent. The interface 64 to SCSI ABIOS is complex and procedurally oriented. It hides the operating system details from ABIOS as well as hiding the details of the SCSI devices from the operating system.

Since the novelty in the invention results from the structure, functions and operation of SDDS 48, the interfaces used therewith will now be briefly described, with more detailed description and examples appearing below. Interface 60 is in accordance with the published interface described in IBM OS/2 Programming Tools and Information Version 1.2, I/O Subsystems and Device Support, Vol. 1- Device Drivers, Sept 1989. The principal data structure used in interface 60 is a conventional OS/2 request packet. Interface 64 is in accordance with the Supplement for the Personal System/2 and Personal Computer BIOS Interface Technical Reference, published December 1989 by IBM Corporation, Form number S15f-2161. The principal data structure used in interface 64 is a conventional ABIOS request block. Interface 62 is patterned after interface 60 and uses a generic IOCTL request packet.

The upper level driver, i.e., each one of the SDCDs, provides the direct connection of SDDS 48 to the operating system while the lower level driver (SGDD 52) provides access to the SCSI devices through services of SCSI ABIOS 40. Each SDCD is called a "device-class" driver because it generally drives devices that belong to a specific SCSI classification. The illustrated classes (printer, optical, and CDROM) are examples of SCSI device types that require a different upper-level class device driver to work in concert with the lower level SGDD. The primary functions of a device-class driver are to present a logical view of the device to the operating system, translate an OS/2 request packet into a SCSI control block and pass it on to the SGDD, and provide multiple vendor support by handling vendor unique features of the device. The general functions of SGDD 52 are to queue all SCSI requests by device, provide control block information to SCSI ABIOS, field all SCSI interrupts, and detect and handle timeout conditions.

Figure 3:
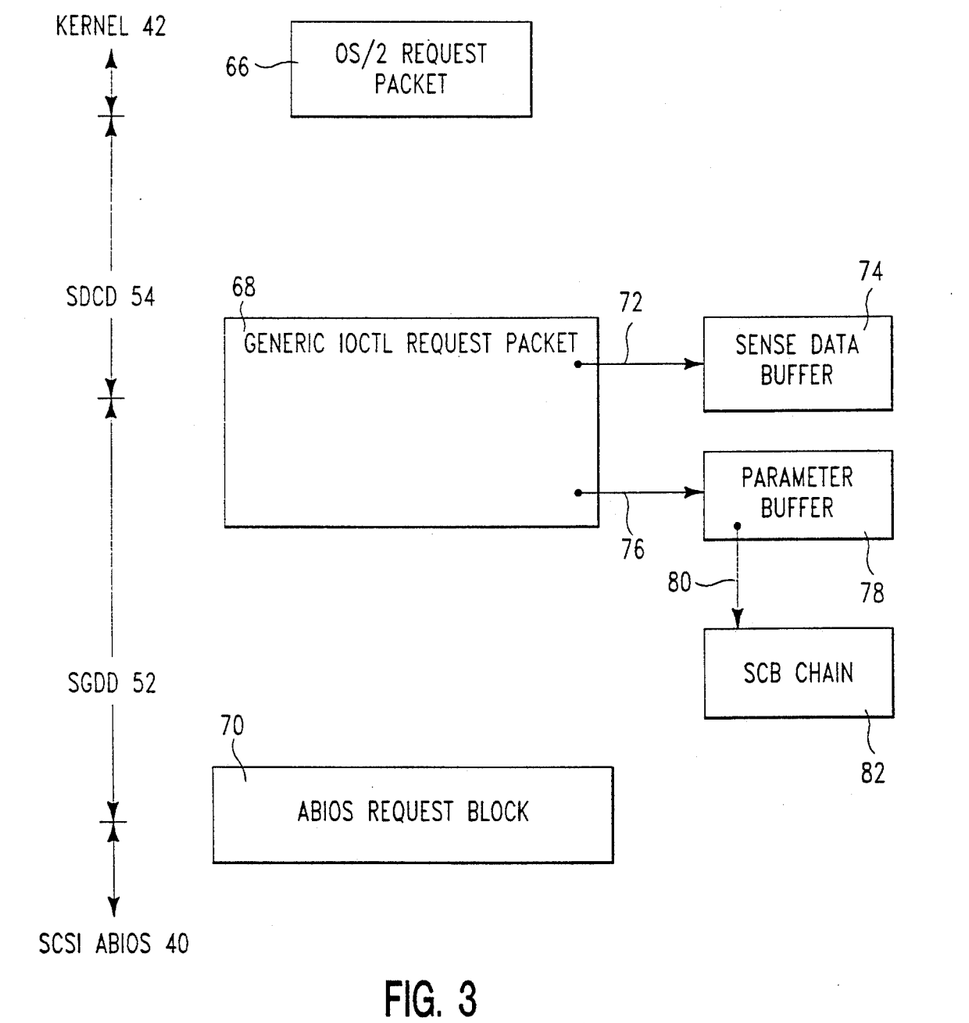
FIG. 3 is a block diagram illustrating certain data structures used in the invention.

As is publicly known, the SCSI architecture provides a standard device interface that greatly simplifies the firmware and software that is necessary to drive a SCSI device. SCSI devices have the ability to respond to commands embedded in control blocks. This means that a SCSI device driver's or driver system's primary task is simply to translate an operating system request block, which is created in response to an application program requesting access to a device, into a control block that the device can understand. The primary data structures involved in this process in accordance with the invention, are shown in FIG. 3. The arrows at the left of FIG. 3 suggest the overlapping nature of the data structures which are generally created by one layer but used by two adjacent layers. An application program initiates access to one of the SCSI devices, by making a system call to operating system kernel 42 which prepares an OS/2 request packet 66. The kernel then calls the appropriate SDCD, e.g. SDCD 54, which prepares a generic IOCTL request packet 68 using information in packet 66. Packet 68 includes a pointer 72 to a sense data buffer 74, and a pointer 76 to a parameter buffer 78. Parameter buffer 78 includes a pointer 80 to the header of a subsystem control block (SCB) chain 82 which is prepared by the SDCD and includes at least one SCB specific to the particular access. Other entries in the chain correspond to different device commands that result from the SDCD breaking down a more general OS/2 request into a series of more specific device commands. SCB chain 82 contains the information specific to the SCSI device being accessed. The SDCD then passes the location of packet 68 to the SGDD which prepares an ABIOS request block 70. Block 70 is then passed to SCSI ABIOS 40 which then sends information to adapter 30 to access the desired device. Upon completion of the device access, the data structures are accessed in the reverse sequence to pass information back to the application program. Thus, packets 66 and 68 and block 70 are the primary means of communication between OS/2, SDCDs, SGDD and SCSI ABIOS.

Request packet 68 contains fields logically divided into a static and variable sections. The fields contain the following information:

| Static Field | Information |
|---|---|
| 1 | Length of request packet |
| 2 | Block device unit code |
| 3 | Command code |
| 4 | Request packet status |
| 5 | Queue linkage |
| Variable | |
| 6 | Function category |
| 7 | Function code |
| 8 | Parameter buffer address |
| 9 | Data buffer address |

ABIOS request block 70 also contains static and variable parts the fields of which contain the following information:

| Static Field | Information |
|---|---|
| 1 | Request block length |
| 2 | Logical ID |
| 3 | Unit |
| 4 | Function |
| 5 | Return code (IN/OUT) |
| 6 | Time-out (OUT) |
| Variable | |
| 7 | Physical pointer to SCB |
| 8 | Logical pointer to SCB chain header |
| 9 | Time to wait before resuming request (stage on time) |
| 10 | Flags |
| 11 | Status |

SCB chain header 82 contains the following fields of information:

| Field | Information |
|---|---|
| 1 | Pointer to next SCB chain header |
| 2 | Logical pointer to TSB |
| 3 | Command |
| 4 | Enable |
| 5 | Logical block address |
| 6 | System buffer address |
| 7 | System buffer byte count |
| 8 | TSB address |
| 9 | Optional SCB chain address |
| 10 | Block count |
| 11 | Block length |

Fields 1 and 2 form a header. Fields 3–11 form an SCB.

A termination status block (TSB) contains the following information:

| Field | Information |
|---|---|
| 1 | SCB status |
| 2 | Retry counts |
| 3 | Residual buffer byte count |
| 4 | Residual buffer address |
| 5 | Address status length |
| 6 | Command/SCSI status |
| 7 | Command/device error codes |
| 8 | Attachment diagnostic error modifier |
| 9 | Cache information |

-continued

| Field | Information |
|---|---|
| 10 | Last SCB address processed |

Within data 59, SGDD 52 also maintains a SCSI device table for keeping track of what is going on, there being one entry for each SCSI device allocated. Each entry contains the following information:

| Field | Information |
|---|---|
| 1 | Pointer to first waiting request |
| 2 | ABIOS logical ID |
| 3 | Interrupt level |
| 4 | Flags for indicating a busy device, staged-on interrupt, sense data needed, allocated device, removable media, retry occurred, request sense called, primary timeout occurred, and secondary timeout occurred. |

Data 59 also includes a started queue which is a chain of ABIOS request blocks 70 that have already called the ABIOS start entry point. This queue is used by the interrupt handler to get ABIOS blocks for calling the ABIOS Interrupt entry point. Such queue allows SGDD to handle concurrent plural requests to access plural SCSI devices. Data 59 also includes a waiting queue for receiving ABIOS request blocks when a particular SCSI device is busy and there is more than one request to access such busy device.

The system is initialized in conventional fashion except that communication between the SDCDs and SGDD is through OS/2 architected inter-device driver communication (IDC) facility. At initialization time, SGDD 52 registers its IDC entry point with the OS kernel 42. Later, when a SDCD initializes, it obtains such entry point from the kernel for use, as described below, in passing control to SGDD 52.

Figure 4:
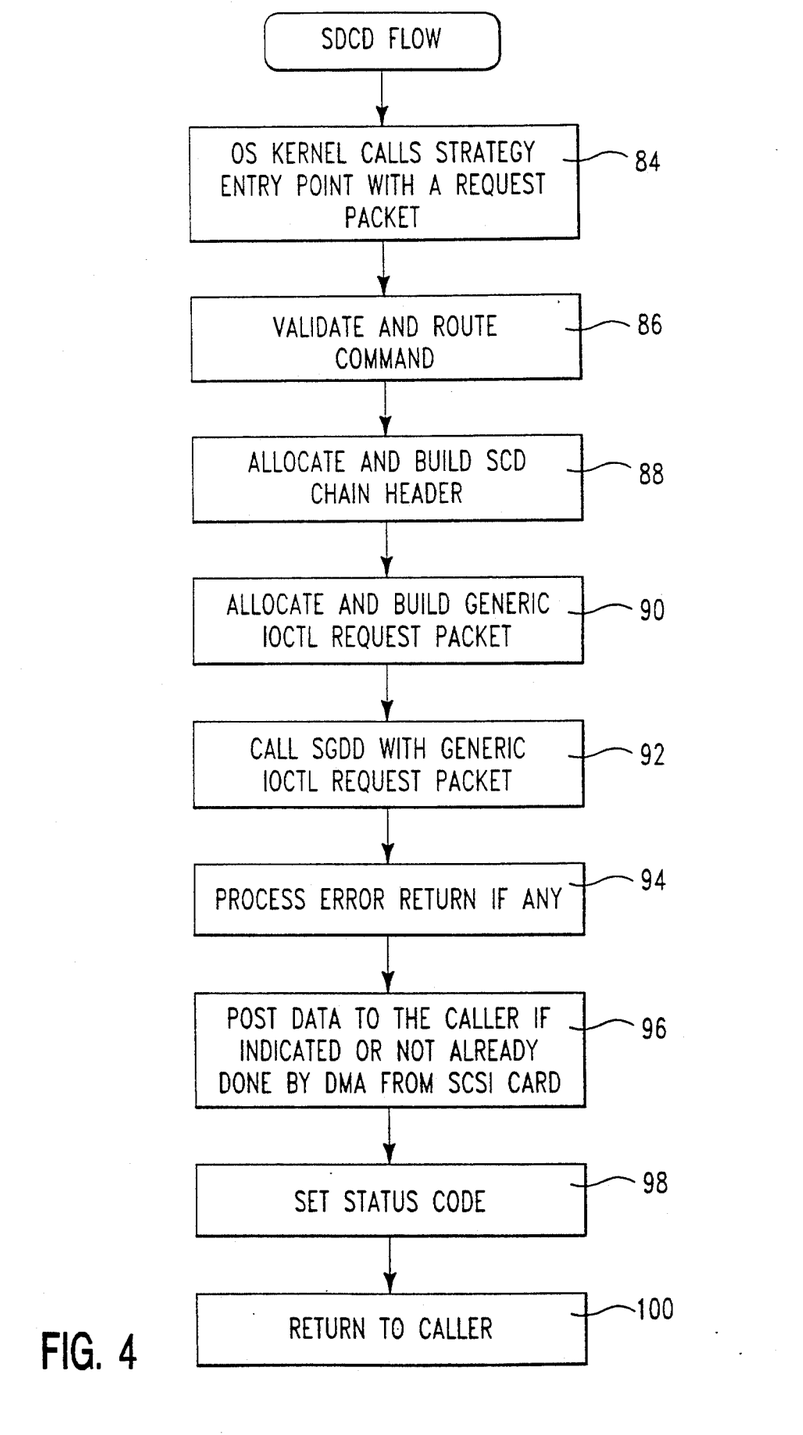
FIG. 4 is flow diagram of the operation of a SCSI device-class driver.

In response to an application request, kernel 42 calls the appropriate SDCD. Referring to FIG. 4, the OS kernel calls the SDCD at its strategy entry point with a request packet 66 in step 84. SDCD first validates and routes the command specified in such packet, in step 86. Then step 88 allocates memory space for and builds an SCB chain header 82 for the request. Step 90 then allocates memory for and builds a generic ioctl request packet 68. Next, in step 92, SDCD points es:bx to packet 68, sets up a context for the SGDD, makes a far call to the SGDD's IDC entry point, and waits for the return. When control is returned to SDCD, step 94 processes any error that may have occurred while accessing the desired device. Step 96 then posts data to the application caller if indicated or if it was not already done by a DMA controller from the SCSI adapter 30. Step 98 sets the status code and step 100 then returns to the caller through the OS kernel.

Figure 5A:
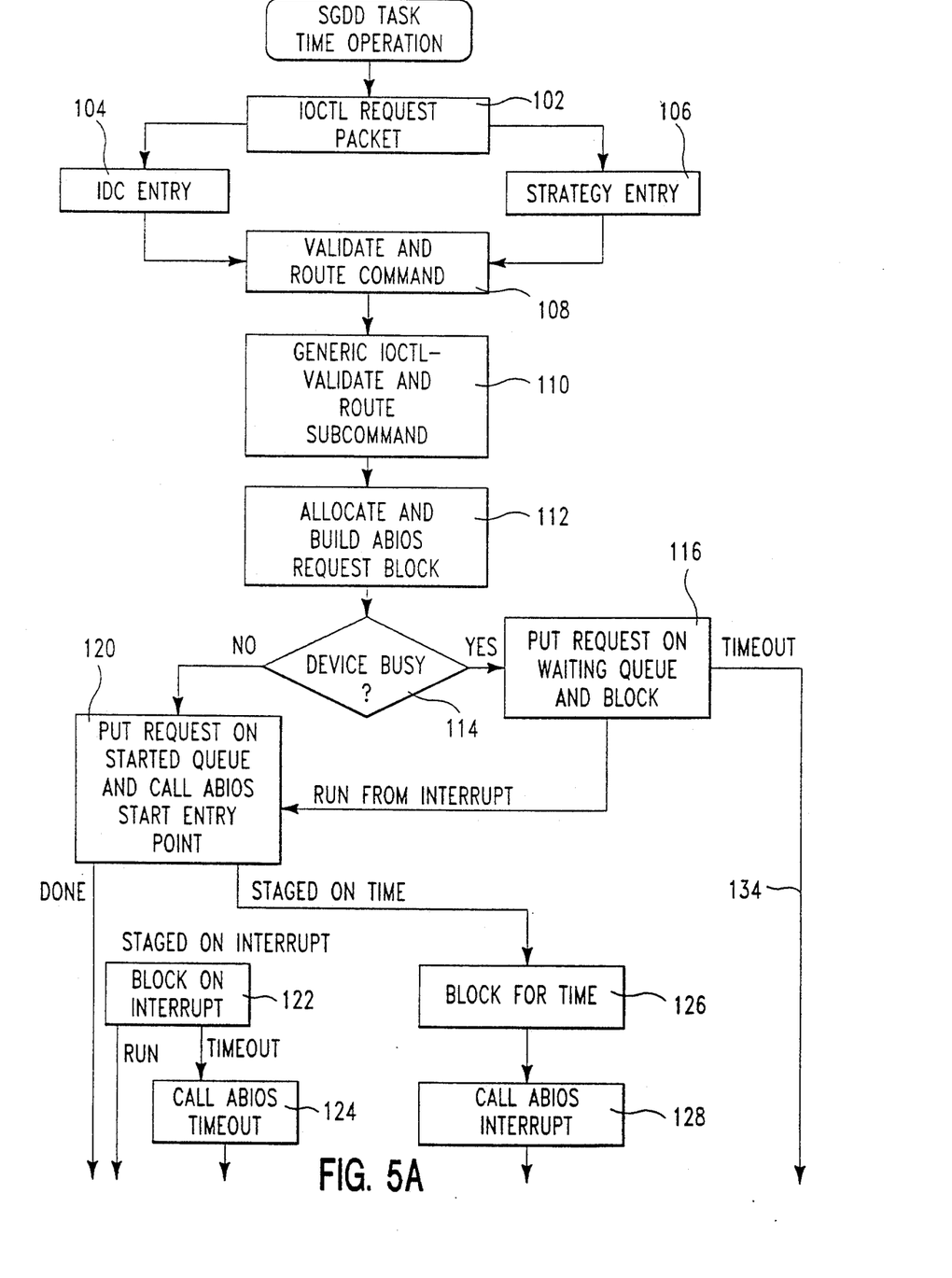
FIGS. 5A and 5B form a flow diagram showing task time operation of the SCSI generic device driver.
Figure 5B:
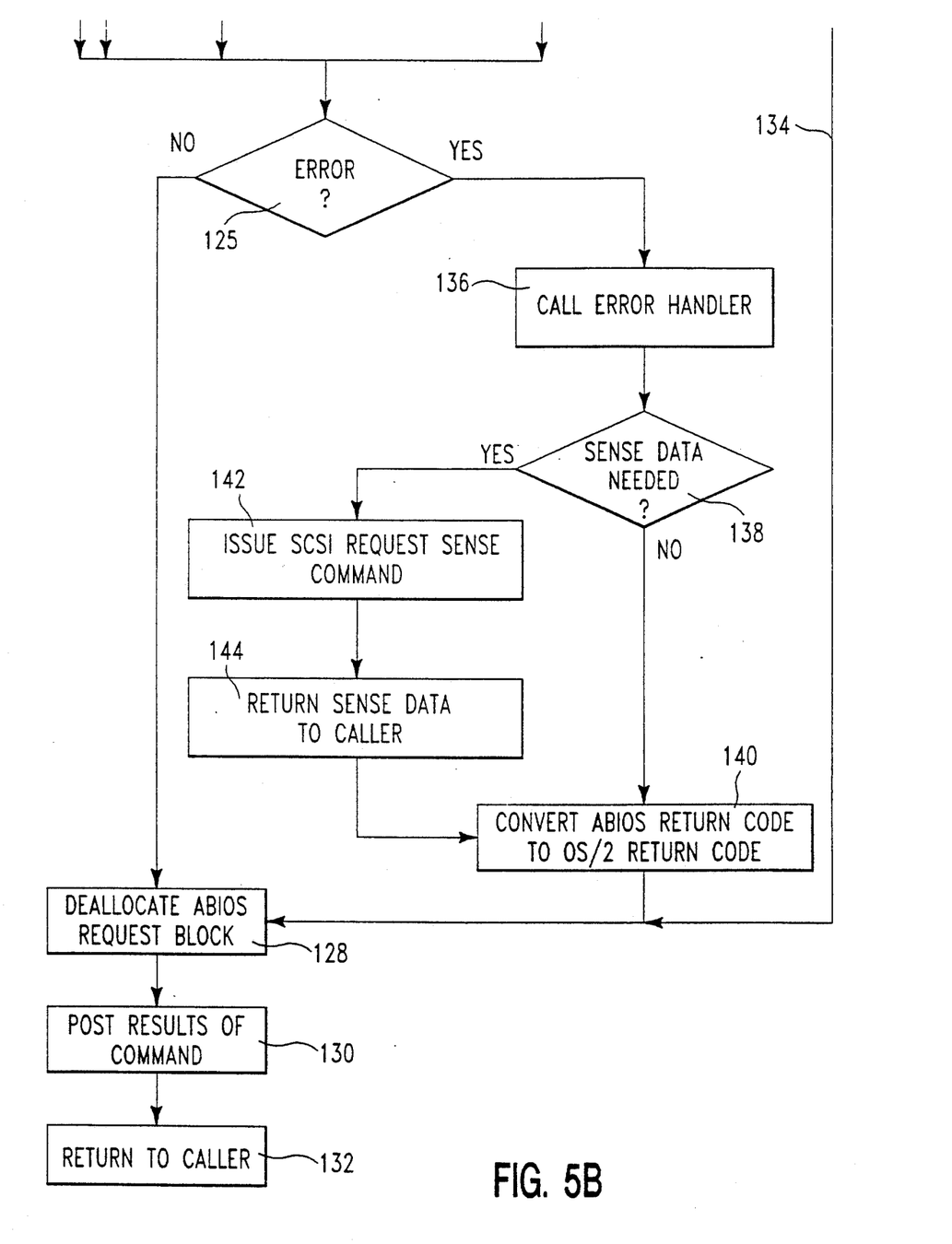

Referring to FIG. 5, the SGDD task time operation begins in step 102 when an IOCTL request packet 68 is passed to SGDD 52 by a far call from SDCD by step 92 (FIG. 3). SGDD has two entry points, an IDC entry 104 and a strategy entry 106 which are the same. Step 108 validates and routes the OS/2 command. Step 110 is entered by recognizing that the OS command is a generic IOCTL command and step 110 validates and routes such command using the function category and function code information in packet 68. In step 112, memory is allocated for an ABIOS request block 70 which is then built by inserting information in its fields as appropriate. Step 114 decides if the device is busy. If not, step 120 puts the request block built in step 112 onto the started queue and calls ABIOS 40 through the Start entry point. If the device is busy, step 116 puts the request block on a waiting queue and blocks by calling the OS/2 DevHlp services. SGDD then waits for a return from ABIOS and the next step will depend on the return code from ABIOS.

Such return code will indicate different conditions, "done", "staged on interrupt", or "staged on time". If the return code indicates a "done" situation, control passes to step 125. If the return code indicates a "staged on interrupt", step 122 calls kernel 42 to perform a block on interrupt operation and upon completion the kernel will provide a return code indicating "run" or "timeout". If the result as defined by the return code from kernel 42 in step 122 is "run" step 125 is then performed. If the result is a "timeout" step 124 calls ABIOS timeout 124 after which step 125 is performed. If the result of step 120 is a "staged on time", step 126 then blocks for time and upon "wakeup", step 128 calls ABIOS interrupt.

Step 125 examines the ABIOS return code and determines if an error was encountered while attempting to access the device. If no error occurred, step 128 deallocates the ABIOS request block, step 130 posts the results of the command, and step 132 returns to the caller. If there was an error, step 136 calls an error handler and step 138 determines if sense data is needed. This is done by examining the associated TSB to determine the nature of the error. If the TSB indicates that more error information should be requested, a request sense command is sent to the device by step 142. The sense data error information is sent directly (step 144) from the device to the associated upper level SDCD through the sense data pointer that is part of the generic IOCTL request packet. The lower level driver (SGDD) then returns an error code indicating that valid sense data is available to the upper level driver to interpret. If sense data is not available from the device, the ABIOS error code is mapped by step 140 to an appropriate OS/2 device driver return code and returned to the upper level driver. The automatic requesting of sense data by the lower lever driver saves time and code in the upper level drivers, as well as ensuring that sense data is not lost by a subsequent command execution that may have been queued in the lower level driver. The driver that queues commands must also issue timely requests for sense data. Following step 140, steps 128, 130 and 132 are sequentially performed. If a timeout 134 occurs while blocked in step 116, steps 128, 130, and 132 are performed.

Figure 6:
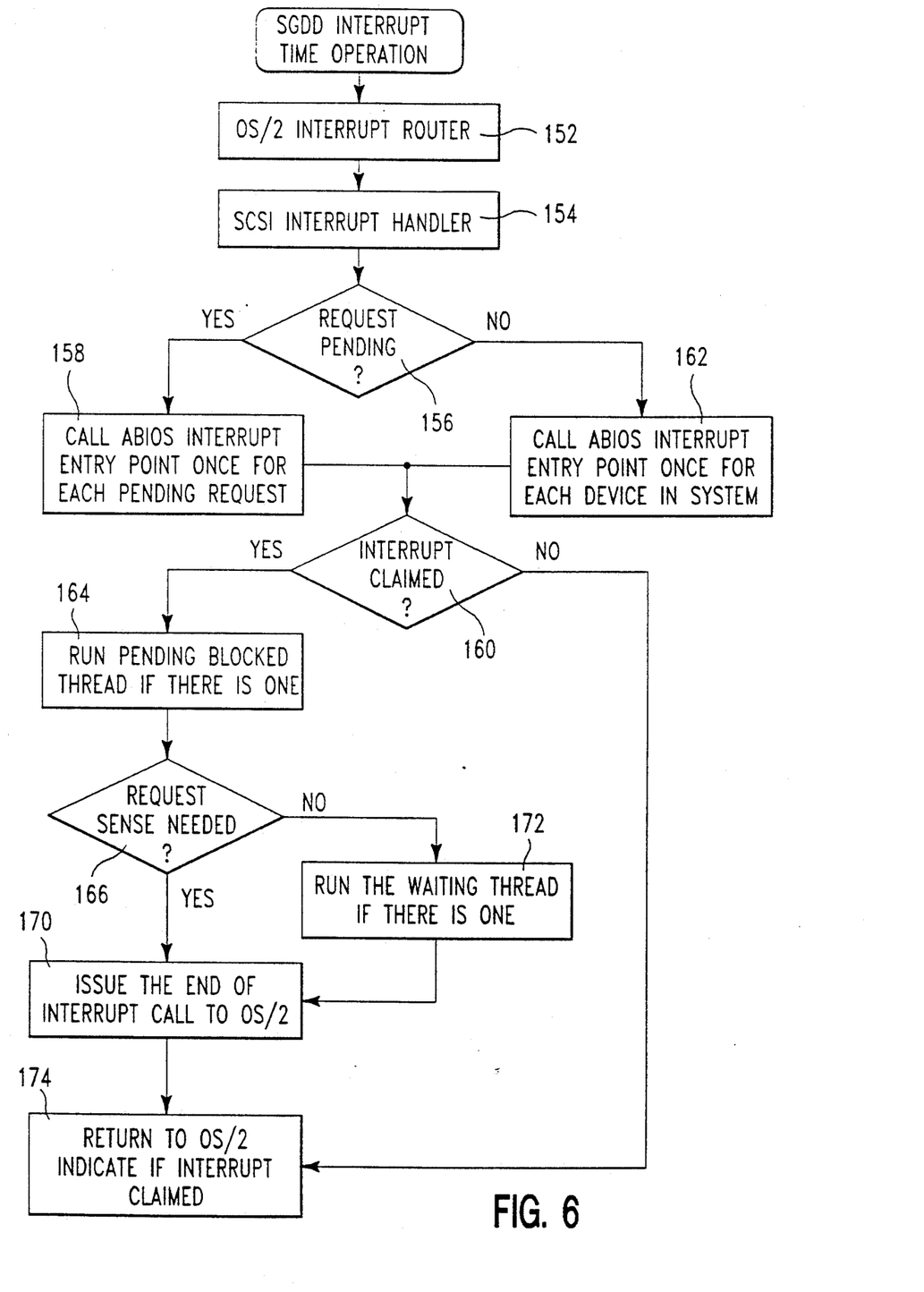
FIG. 6 is a flow diagram showing interrupt time operation of the SCSI generic device driver.

Referring to FIG. 6, in step 152, the OS interrupt handler first receives the interrupt, determines it is for the SCSI drivers and then calls the SCSI interrupt handler 154 which then proceeds to perform the remaining steps shown in FIG. 6. Step 156 decides if there is any pending request on the Started Queue. If the started queue is not empty, a request is pending, i.e., staged on interrupt. If there is a request pending, step 158 calls the ABIOS interrupt entry point once for each request on the started queue, and provides the address of that pending ABIOS request block to ABIOS for service. If there is no request pending, step 162 calls the ABIOS interrupt entry point once for each device in the system. After either of steps 158 or 162, step 160 decides if there is a claimed interrupt, i.e., ABIOS indicates one of the SCSI devices caused the interrupt. If not, a branch is made to step 174. If there is a claimed interrupt, step 164 runs the pending block thread corresponding to the serviced request. If ABIOS indicates that an error has occurred, step 166 checks the associated TSB to see if such error requires a request sense call. If not, step 172 runs the first thread waiting for access to the device that caused the interrupt. If a request sense is needed or upon completion of step 172, step 170 issues an end of interrupt call to OS/2. Finally, step 174 returns to OS/2 and indicates whether or not an interrupt is claimed.

It should be apparent to those skilled in the art that many changes can be made in the details and arrangements of steps and parts without departing from the scope of the invention as defined in the appended claims.

What is claimed is:

1. A data processing system comprising:
   at least one SCSI device of a type within a predetermined SCSI device-class;
   a SCSI adapter connected to control said SCSI device, said adapter being operable upon receiving a subsystem control block (SCB) to access said device, said SCB containing information affording access to said device and including an access command;
   a read only memory for storing a SCSI advanced basic I/O system (ABIOS) program, said SCSI ABIOS program being operable to control access to said device in response to receiving an ABIOS request block, which includes said SCB;
   a main memory for storing a multitasking operating system, and at least one application program;
   a processor for executing said application program and operating said data processing system under control of said operating system whereby said operating system creates a system request packet for accessing said SCSI device in response to receiving an I/O request from said application program;
   a device driver system functionally layered between said operating system and said SCSI ABIOS program for translating said system request packet from said operating system into said SCB, said device driver system comprising a plurality of SCSI device class driver (SDCD) means each providing driver functions common to a different class of SCSI devices, and a SCSI generic device driver (SGDD) means providing driver functions used in common by all of said SDCD means;
   said SDCD means being functionally layered beneath said operating system and communicating therewith through a first interface through which said system request packet is transmitted by said operating system, said SDCD means comprising
      first means for constructing said SCB and a first request block in response to receiving said system request packet from said operating system;
   said SGDD means being functionally layered between said SDCD means and said SCSI ABIOS program, said SGDD means communicating with said SDCD means by a second interface through which said first request block is passed, said SGDD means communicating with said SCSI ABIOS program through a third interface, said SGDD means comprising
      second means for constructing an ABIOS request block in response to receiving said first request block from said SDCD means, and
      third means for calling said SCSI ABIOS program and passing said ABIOS request block through said third interface to said SCSI ABIOS program;
   said SCSI ABIOS program being operative to transmit said SCB to said SCSI adapter for accessing said SCSI device and to generate and transmit to said SGDD means, a first return code when said SCSI device is successfully accessed and a second return code when a error occurs while accessing said SCSI device, which error is accompanied by sense data being generated by said SCSI device indicating the nature of said error; and
   said SGDD means further comprising fourth means for automatically furnishing sense data directly from said SCSI device to said SDCD means in response to said SGDD means receiving said second return code, wherein said fourth means comprises:
      fifth means for determining that sense data is needed;
      sixth means for requesting said SCSI device to furnish said sense data directly to said SDCD means; and
      seventh means for notifying said SDCD means that valid sense data is available.

2. A data processing system in accordance with claim 1 wherein:
   said data processing system comprises a second SCSI device of a different type but within the same class as said first mentioned SCSI device;
   said operating system is operative to transmit a subsequent system request packet to the one of said SDCD means which received said first mentioned system request packet; and
   said one SDCD means is operative to process said subsequent system request packet.

3. A data processing system in accordance with claim 1 wherein:
   said data processing system includes a plurality of SCSI devices;
   said operating system is operable to receive plural concurrent requests to access said SCSI devices; and
   said second means is operable to construct plural ABIOS request blocks one for each of said requests, and to queue said plural ABIOS request blocks in a started queue.

4. A data processing system in accordance with claim 3 wherein:
   said SGDD means, in response to a subsequent attempt to access a busy SCSI device, places an associated ABIOS request block for such attempt in a waiting queue; and
   said SGDD means is further operable, upon receiving an interrupt when such busy device becomes accessible, to remove said associated ABIOS request block from said waiting queue and place it on said started queue.

* * * * *